(12) United States Patent
Yamada

(10) Patent No.: US 10,804,715 B2
(45) Date of Patent: Oct. 13, 2020

(54) ELECTRICALLY DRIVEN VEHICLE

(71) Applicant: Toyota Jidosha Kabushiki Kaisha, Toyota-shi, Aichi-ken (JP)

(72) Inventor: Hidenori Yamada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 24 days.

(21) Appl. No.: 16/255,059

(22) Filed: Jan. 23, 2019

(65) Prior Publication Data

US 2019/0237979 A1 Aug. 1, 2019

(30) Foreign Application Priority Data

Jan. 26, 2018 (JP) .................. 2018-011711

(51) Int. Cl.
*H02J 7/00* (2006.01)
*B60L 50/51* (2019.01)
*B60L 50/60* (2019.01)
*B60L 58/10* (2019.01)
*B60L 53/10* (2019.01)
*B60L 3/00* (2019.01)

(52) U.S. Cl.
CPC .......... *H02J 7/0029* (2013.01); *B60L 3/0084* (2013.01); *B60L 50/51* (2019.02); *B60L 50/66* (2019.02); *B60L 53/10* (2019.02); *B60L 58/10* (2019.02); *B60L 2210/14* (2013.01); *B60L 2210/30* (2013.01); *B60L 2210/40* (2013.01); *B60L 2260/22* (2013.01); *B60L 2260/26* (2013.01); *B60L 2270/20* (2013.01)

(58) Field of Classification Search
CPC ........ H02J 7/0029; B60L 50/66; B60L 58/10; B60L 50/51; B60L 53/10; B60L 3/0084; B60L 2210/14; B60L 2210/40
See application file for complete search history.

(56) References Cited

U.S. PATENT DOCUMENTS

| | | | | |
|---|---|---|---|---|
| 5,900,722 A | * | 5/1999 | Scott .................... | B23K 9/1062 290/49 |
| 6,018,200 A | * | 1/2000 | Anderson ............ | B23K 9/1062 290/1 A |
| 6,118,186 A | * | 9/2000 | Scott ........................ | H02P 9/04 290/1 A |

(Continued)

FOREIGN PATENT DOCUMENTS

JP 2010-183671 A 8/2010

*Primary Examiner* — Behrang Badii
*Assistant Examiner* — Daniel L Greene
(74) *Attorney, Agent, or Firm* — Dinsmore & Shohl LLP

(57) ABSTRACT

An electrically driven vehicle comprises a motor, a power storage device, a charging device configured to charge the power storage device by using electric power from an external AC power supply, and a control device configured to control the motor and the charging device. When execution of a drive-ready process is required during a charging termination process that is performed on termination of charging of the power storage device by the charging device, the control device interrupts the charging termination process, performs the drive-ready process and resumes the charging termination process after completion of the drive-ready process. This configuration enables the drive-ready process to be completed promptly even in the case of a start request during the charging termination process.

4 Claims, 3 Drawing Sheets

(56) References Cited

U.S. PATENT DOCUMENTS

| | | | |
|---|---|---|---|
| 2016/0072422 A1* | 3/2016 | Kuroki | H02M 1/32 318/519 |
| 2016/0121750 A1* | 5/2016 | Eifert | B60L 15/2072 320/109 |
| 2017/0227589 A1* | 8/2017 | Kawanaka | G01R 31/007 |
| 2019/0137558 A1* | 5/2019 | Hamada | G01R 31/005 |

* cited by examiner

ELECTRICALLY DRIVEN VEHICLE

CROSS-REFERENCE TO RELATED APPLICATION

This application claims priority to Japanese Patent Application No. 2018-011711 filed on Jan. 26, 2018, the contents of which is incorporated herein by reference.

TECHNICAL FIELD

The present disclosure relates to an electrically driven vehicle and more specifically relates to an electrically driven vehicle equipped with a charging device configured to charge a power storage device that transmits electric power to and from a motor configured to output a power for driving, using electric power from an external AC power source.

BACKGROUND

On termination of charging of a power storage device by a charger using electric power from an external power supply, a proposed configuration of an electrically driven vehicle turns off a charger relay after discharge of a charger capacitor (as described in, for example, JP 2010-183671A). This electrically driven vehicle performs discharge of the charger capacitor after termination of charging and thereby prevents inrush current flowing from the charger capacitor to the vehicle side at a next start of charging.

CITATION LIST

Patent Literature

PTL 1: JP2010-183671A

SUMMARY

The electrically driven vehicle described above may receive a start request of the vehicle (request for a drive-ready process) during a charging termination process that is performed after termination of charging and includes, for example, a discharge process of the charger capacitor and an off process of the charger relay. In this case, the drive-ready process may be performed after completion of the charging termination process. This, however, takes time before completion of the drive-ready process since the start request.

A main object of an electrically driven vehicle of the present disclosure is to promptly complete a drive-ready process even in the case of a start request during a charging termination process.

In order to achieve the above primary object, the electrically driven vehicle of the disclosure is implemented by an aspect described below.

The present disclosure is directed to an electrically driven vehicle. The electrically driven vehicle includes a motor configured to output a power for driving, a power storage device configured to transmit electric power to and from the motor, a charging device configured to charge the power storage device by using electric power from an external AC power supply, and a control device configured to control the motor and the charging device. When execution of a drive-ready process is required during a charging termination process that is performed on termination of charging of the power storage device by the charging device, the control device interrupts the charging termination process, performs the drive-ready process and resumes the charging termination process after completion of the drive-ready process.

The electrically driven vehicle according to this aspect of the present disclosure comprises the motor configured to output the power for driving; the power storage device configured to transmit electric power to and from the motor; the charging device configured to charge the power storage device by using electric power from the external AC power supply; and the control device configured to control the motor and the charging device. When execution of the drive-ready process is required during the charging termination process that is performed on termination of charging of the power storage device by the charging device, the electrically driven vehicle of this aspect interrupts the charging termination process, performs the drive-ready process and resumes the charging termination process after completion of the drive-ready process. This configuration enables the drive-ready process to be completed promptly even when execution of the drive-ready process is required during the charging termination process. This configuration also completed the charging termination process. This accordingly avoids a potential trouble due to a failure in completion of the charging termination process.

DESCRIPTION OF EMBODIMENTS

Figure 1:
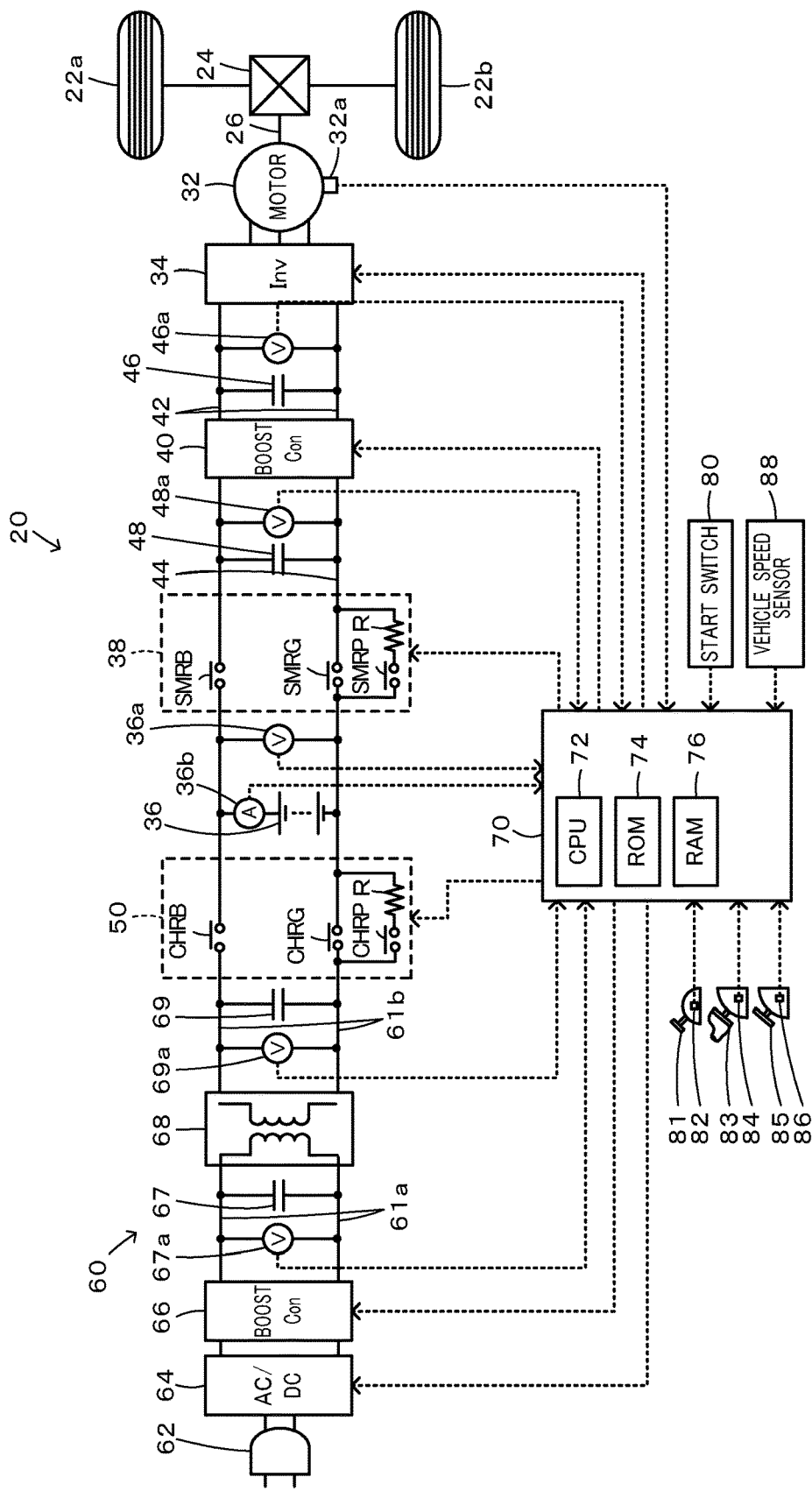
FIG. 1 is a configuration diagram illustrating the schematic configuration of an electric vehicle according to one embodiment of the present disclosure.

The following describes some aspects of the present disclosure with reference to an embodiment. FIG. 1 is a configuration diagram illustrating the schematic configuration of an electric vehicle 20 according to one embodiment of the present disclosure. As illustrated, the electric vehicle 20 of the embodiment includes a motor 32, an inverter 34, a battery 36, a boost converter 40, a system main relay 38, a charging relay 50, a charging device 60 and an electronic control unit 70.

The motor 32 is configured as a synchronous generator motor having a rotor with permanent magnets embedded therein and a stator with three-phase coils wound thereon. The rotor of this motor 32 is connected with a driveshaft 26 that is coupled with drive wheels 22a and 22b via a differential gear 24.

The inverter 34 is connected with the motor 32 and is also connected with high voltage-side power lines 42. This inverter 34 is configured as a known inverter circuit including six transistors and six diodes.

The battery 36 is configured by, for example, a lithium ion rechargeable battery or a nickel metal hydride battery and is connected with low voltage-side power lines 44.

The boost converter 40 is connected with the high voltage-side power lines 42 and with the low voltage-side power lines 44, which the battery 36 is connected with. The boost converter 40 is configured as a known step-up/down converter circuit including two transistors, two diodes and a reactor.

The system main relay 38 is mounted to the low voltage-side power lines 44. The system main relay 38 includes a positive electrode-side relay SMRB provided on a positive bus bar of the low voltage-side power lines 44, a negative electrode-side relay SMRG provided on a negative bus bar of the low voltage-side power lines 44, and a precharge circuit configured such that a precharge resistance R and a precharge relay SMRP are connected in series to bypass the negative electrode-side relay SMRG.

A high voltage-side capacitor 46 is connected with a positive bus bar and a negative bus bar of the high voltage-side power lines 42, and a low voltage-side capacitor 48 is connected with the positive bus bar and the negative bus bar of the low voltage-side power lines 44.

The charging relay 50 is connected with the low voltage-side power lines 44, which the battery 36 is connected with, and with second charging power lines 61b, which the charging device 60 is connected with, and is turned on and off to connect and disconnect the battery 36 with and from the charging device 60. The charging relay 50 includes a positive electrode-side relay CHRB provided on a positive bus bar of the second charging power lines 61b, a negative electrode-side relay CHRG provided on a negative bus bar of the second charging power lines 61b, and a precharge circuit configured such that a precharge resistance R and a precharge relay CHRP are connected in series to bypass the negative electrode-side relay CHRB.

The charging device 60 includes a connector 62, an AC/DC converter 64, a boost converter 66 and a transformer 68 and is configured to charge the battery 36 using electric power from a commercial AC power supply in the state that the connector 62 is connected with the commercial AC power supply.

The AC/DC converter 64 is connected with the connector 62 and with the boost converter 66 and is configured as a known AC/DC converter circuit to convert an AC power from the commercial AC power supply into a DC power. The boost converter 66 is configured as a known boost converter circuit including two transistors, two diodes and one reactor and serves to boost the voltage of the DC power converted by the AC/DC converter and supply the DC power of the boosted voltage to the first charging power lines 61a. The transformer 68 is connected with first charging power lines 61a and with the second charging power lines 61b and serves to insulate the first charging power lines 61a-side and the second charging power lines 61b-side from each other.

A first capacitor 67 for smoothing is connected with the first charging power lines 61a, and a second capacitor 69 for smoothing is connected with the second charging power lines 61b.

The electronic control unit 70 is configured as a CPU 72-based microprocessor and includes a ROM 74 configured to store processing programs, a RAM 76 configured to temporarily store data, a flash memory (not shown), input/output ports (not shown) and a communication port (not shown), in addition to the CPU 72.

Signals from various sensors are input into the electronic control unit 70 via the input port. The signals input into the electronic control unit 70 include, for example, a start signal STSW from a start switch 80, a shift position SP from a shift position sensor 82 configured to detect an operating position of a shift lever 81, an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The input signals also include a rotational position θm from a rotational position detection sensor (for example, a resolver) 32a configured to detect the rotational position of the rotor of the motor 32, a voltage VB from a voltage sensor 36a placed between terminals of the battery 36, and an electric current IB from a current sensor 36b mounted to an output terminal of the battery 36. The input signals further include a voltage VH of the high voltage-side capacitor 46 (high voltage-side power lines 42) from a voltage sensor 46a placed between terminals of the high voltage-side capacitor 46, and a voltage VL of the low voltage-side capacitor 48 (low voltage-side power lines 44) from a voltage sensor 48a placed between terminals of the low voltage-side capacitor 48. Additionally, the input signals include a charging voltage Vchg1 from a voltage sensor 67a mounted to the first charging power lines 61a and a charging voltage Vchg2 from a voltage sensor 69a mounted to the second charging power lines 61b.

Various control signals are output from the electronic control unit 70 via the output port. The signals output from the electronic control unit 70 include, for example, switching control signals to the transistors of the inverter 34, switching control signals to the transistors of the boost converter 40 and a drive control signal to the system main relay 38. The output signals also include a drive control signal to the charging relay 50, a control signal to the AC/DC converter 64 and switching control signals to the transistors of the boost converter 66.

Figure 2:
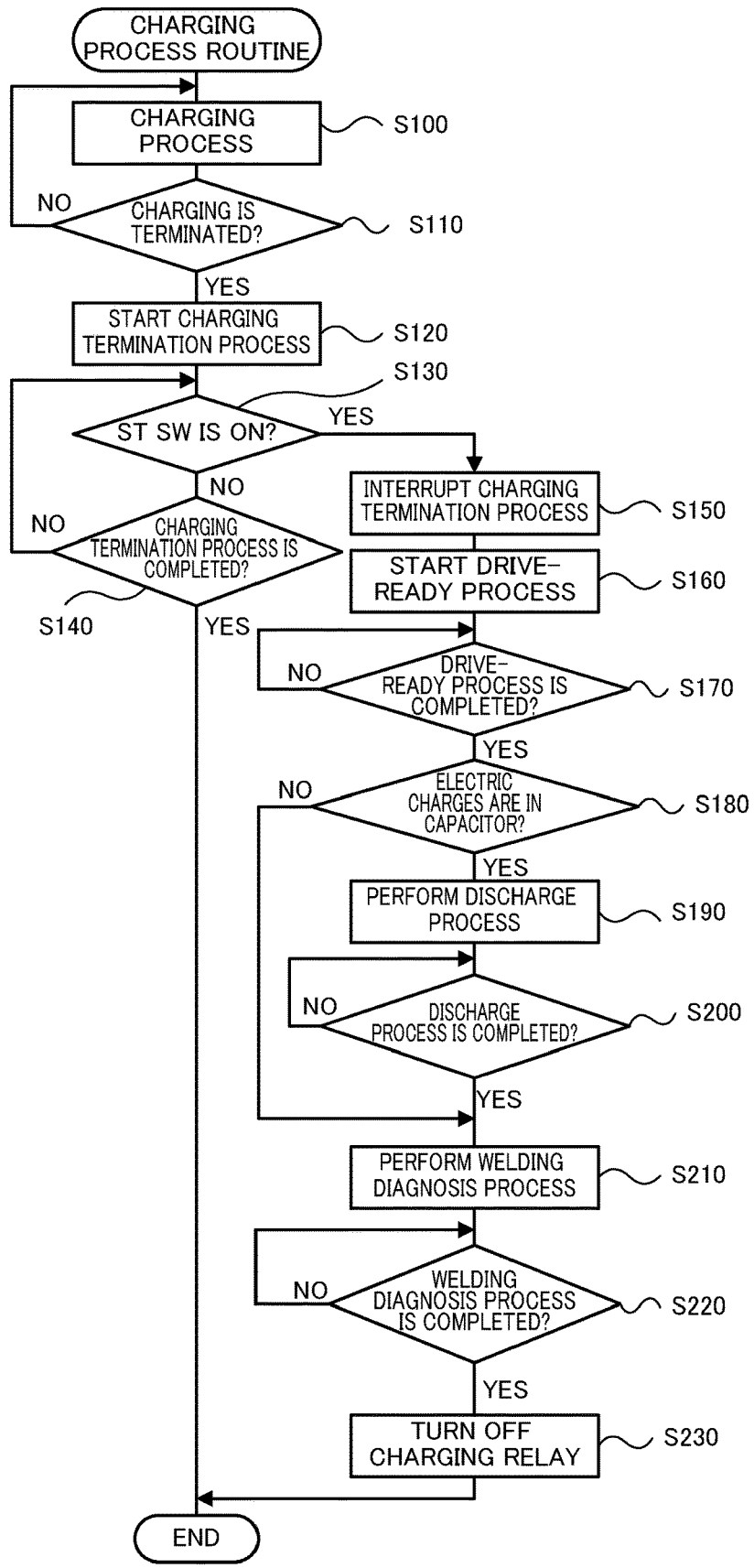
FIG. 2 is a flowchart showing one example of a charging process routine performed by an electronic control unit.

The following describes the operations of the electric vehicle 20 of the embodiment having the configuration described above or more specifically a series of operations on termination of charging of the battery 36 using electric power from a commercial AC power supply (hereinafter simply referred to as "external charging"). FIG. 2 is a flowchart showing one example of a charging process routine performed by the electronic control unit 70.

When the charging process routine is triggered, the CPU 72 of the electronic control unit 70 repeatedly performs a charging process until termination of charging (steps S100 and S110). The charging process denotes a process of controlling the AC/DC converter 64 and the boost converter 66, such as to supply an electric power required for charging from the charging device 60 according to the voltage VB and the electric current IB flowing in the battery 36. The charging process is, however, not the core of the present disclosure and is not described in detail. Charging may be terminated, for example, when full charge of the battery 36 is detected, when a predetermined charging time has elapsed, or when, for example, the user pulls out the connector 62 from the commercial AC power supply in the course of charging.

When it is determined at step S110 that charging is terminated, the CPU 72 starts a charging termination process (step S120). The charging termination process performs a stop process of stopping the operations of the AC/DC converter 64 and the boost converter 66, a discharge process of discharging electric charges of the first capacitor 67 mounted to the first charging power lines 61a, a welding diagnosis process of determining whether the positive electrode-side relay CHRB and the negative electrode-side relay CHRG of the charging relay 50 are welded, and a relay off process of turning off the charging relay 50, in this sequence. The discharge process switches the transistors of the boost converter 66 such as to minimize the effect on the voltage of the second charging power lines 61b and discharges the electric charges of the first capacitor 67 by power consumption of this switching loss. The discharge process accordingly takes a certain period of time (for example, 3 minutes, 5 minutes or 7 minutes). The welding diagnosis process may be, for example, a diagnosis process using a voltage change of the second capacitor 69 caused by on-off operations of the positive electrode-side relay CHRB in the state that only the precharge relay CHRP is ON. As described above, the discharge process switches the transistors of the boost converter 66 such as to minimize the effect on the voltage of the second charging power lines 61b but slightly changes the voltage of the second charging power lines 61b. The welding diagnosis process, on the other hand, uses a voltage change of the second capacitor 69. Accordingly, simultaneously performing the discharge process and the welding diagnosis process is likely to cause a wrong diagnosis in the welding diagnosis process. According to the embodiment, the welding diagnosis process is performed after completion of the discharge process, in order to avoid such a wrong diagnosis.

When the charging termination process is started, the CPU 72 determines whether the start switch 80 is switched on prior to completion of the charging termination process (steps S130 and S140). When it is determined that the charging termination process is completed without switching on the start switch 80, the CPU 72 terminates this routine.

When it is determined that the start switch 80 is switched on prior to completion of the charging termination process, on the other hand, the CPU 72 interrupts the charging termination process (step S150), starts a drive-ready process (step S160), and waits for completion of the drive-ready process (step S170). The drive-ready process includes, for example, an abnormality diagnosis process of determining whether any abnormality occurs in the boost converter 40, the inverter 34, the motor 32 and the like, and a relay on process of turning on the system main relay 38. The configuration of interrupting the charging termination process and performing the drive-ready process enables the drive-ready process to be completed more promptly, compared with a configuration of performing the drive-ready process after completion of the charging termination process.

On completion of the drive-ready process, the CPU 72 determines whether electric charges are accumulated in the first capacitor 67 mounted to the first charging power lines 61a (step S180). This determination may be based on the charging voltage Vchg1 from the voltage sensor 67a. When it is determined that electric charges are accumulated in the first capacitor 67, the CPU 72 determines that the discharge process is not completed in the charging termination process, performs the discharge process (step S190) and waits for completion of the discharge process (step S200). When it is determined that the charging process is completed, the CPU 72 performs the welding diagnosis process (step S210), waits for completion of the welding diagnosis process (step S220), turns off the charging relay 50 (step S230) and then terminates this routine. Performing the welding diagnosis process after completion of the discharge process reduces the possibility of a wrong diagnosis in the welding diagnosis process.

When it is determined at step 3180 that no electric charges are accumulated in the first capacitor 67, the CPU 72 determines that the discharge process is completed, performs the welding diagnosis process (steps S210 and S220), turns off the charging relay 50 (step S230) and then terminates this routine.

Figure 3:
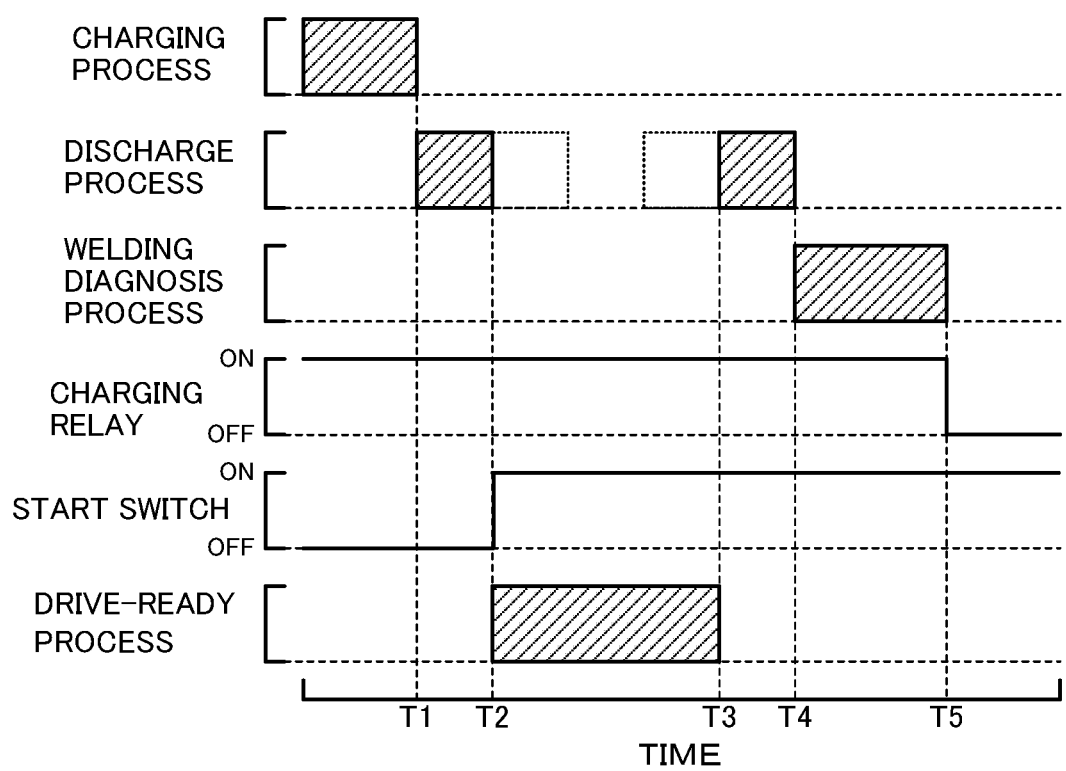
FIG. 3 is a diagram illustrating one example of the flow of respective processes when a start switch is switched on during a charging termination process that is performed in response to a pull-out of a connector in the course of charging.

FIG. 3 is a diagram illustrating one example of the flow of respective processes when the start switch 80 is switched on during the charging termination process that is performed in response to a pull-out of the connector 62 in the course of charging. It is assumed that the discharge process, the welding diagnosis process and the relay off process are performed as the charging termination process in FIG. 3. At a time T1 when the connector 62 is pulled out during the charging process, the charging process is stopped, and the discharge process in the charging termination process is started. When the start switch 80 is switched on at a time T2 during the discharge process, the discharge process is interrupted, and the drive-ready process is started. At a time T3 when the drive-ready process is completed, the interrupted discharge process is restarted. At a time T4 when the discharge process is completed, the welding diagnosis process is started. At a time T5 when the welding diagnosis process is completed, the charging relay 50 is turned off, and the charging process routine is terminated.

As described above, when the start switch 80 is switched on during the charging termination process in response to detection of termination of charging, the electric vehicle 20 of the embodiment interrupts the charging termination process and performs the drive-ready process. This configuration enables the drive-ready process to be completed more promptly, compared with the configuration of performing the drive-ready process after completion of the charging termination process.

The electric vehicle 20 of the embodiment determines whether electric charges are accumulated in the first capacitor 67 on completion of the drive-ready process. When it is determined that electric charges are accumulated in the first capacitor 67, the electric vehicle 20 of the embodiment performs the discharge process. This enables the electric charges in the first capacitor 67 to be discharged reliably. The electric vehicle 20 of the embodiment waits for completion of the discharge process and performs the welding diagnosis process of the charging relay 50. This reduces the possibility of a wrong diagnosis in the welding diagnosis process.

The electric vehicle 20 of the embodiment performs the stop process of the AC/DC converter 64 and the boost converter 66, the discharge process of the first capacitor 67, the welding diagnosis process of the charging relay 50, and the relay off process of turning off the charging relay 50, as the charging termination process. The charging termination process is, however, not limited to these processes but may include other processes.

The electric vehicle 20 of the embodiment uses the battery 36 as a power storage device. The power storage device may, however, be any device that is capable of accumulating electricity, for example, a capacitor.

The embodiment describes the aspect of the electric vehicle 20 equipped with the motor 32. The present disclosure may also be applicable to the aspect of a hybrid vehicle equipped with an engine in addition to the motor 32.

The electrically driven vehicle of the above aspect may include a charging relay configured to connect and disconnect the power storage device with and from the charging device. And the charging device may include a first capacitor for smoothing, the charging termination process may include a discharge process of discharging electric charges of the first capacitor and a welding detection process of detecting welding of the charging relay, and the control device may perform the welding detection process after completion of the discharge process, as the charging termination process. This configuration suppresses a potential trouble caused by performing the discharge process and the welding detection process simultaneously, for example, a wrong detection of welding.

In this case, the charging device may include a connector that is connected with the external AC power supply, a power converter that converts an AC power from the external AC power supply into a DC power, a booster that includes a switching element and boosts a voltage of the DC power from the power converter, and a transformer that is connected with the booster and a charging relay side, the first capacitor may be placed between the booster and the transformer, and the discharge process may discharge electric charges of the first capacitor by a switching loss of the switching element of the booster. This configuration suppresses a voltage change on the charging relay side of the transformer due to the discharge process. Further, in this case, the charging device may include a second capacitor for smoothing that is placed between the transformer and the charging relay, and the welding detection process may detect welding, based on a voltage change of the second capacitor caused by an on-off operation of each element of the charging relay.

The following describes the correspondence relationship between the primary elements of the above embodiment and the primary elements of the disclosure described in Summary. The motor 32 of the embodiment corresponds to the "motor", the battery 36 corresponds to the "power storage device", the charging device 60 corresponds to the "charging device", the electronic control unit 70 corresponds to the "control device", the charging relay 50 corresponds to the "charging relay", the first capacitor 67 corresponds to the "first capacitor", the connector 62 corresponds the "connector", the AC/DC converter 64 corresponds to the "power converter", the boost converter 66 corresponds to the "booster", the transformer 68 corresponds to the "transformer", and the second capacitor 69 corresponds to the "second capacitor".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of electrically driven vehicles.

The invention claimed is:
1. An electrically driven vehicle, comprising:
a motor configured to output a power for driving;
a power storage device configured to transmit electric power to and from the motor;
a charging device configured to charge the power storage device by using electric power from an external AC power supply; and
an electronic control unit configured to control the motor and the charging device, wherein
when execution of a drive-ready process is required during a charging termination process that is performed on termination of charging of the power storage device by the charging device, the electronic control unit interrupts the charging termination process, performs the drive-ready process and resumes the charging termination process after completion of the drive-ready process.

2. The electrically driven vehicle according to claim 1, further comprising:
a charging relay configured to connect and disconnect the power storage device with and from the charging device, wherein
the charging device includes a first capacitor for smoothing,
the charging termination process includes a discharge process of discharging electric charges of the first capacitor and a welding detection process of detecting welding of the charging relay, and
the electronic control unit performs the welding detection process after completion of the discharge process, as the charging termination process.

3. The electrically driven vehicle according to claim 2, wherein the charging device comprises a connector that is connected with the external AC power supply, a power converter that converts an AC power from the external AC power supply into a DC power, a booster that includes a switching element and boosts a voltage of the DC power from the power converter, and a transformer that is connected with the booster and a charging relay side,
the first capacitor is placed between the booster and the transformer, and
the discharge process discharges electric charges of the first capacitor by a switching loss of the switching element of the booster.

4. The electrically driven vehicle according to claim 3, wherein the charging device includes a second capacitor for smoothing that is placed between the transformer and the charging relay, and
the welding detection process detects welding, based on a voltage change of the second capacitor caused by an on-off operation of each element of the charging relay.

* * * * *

UNITED STATES PATENT AND TRADEMARK OFFICE
CERTIFICATE OF CORRECTION

| | | |
|---|---|---|
| PATENT NO. | : 10,804,715 B2 | Page 1 of 1 |
| APPLICATION NO. | : 16/255059 | |
| DATED | : October 13, 2020 | |
| INVENTOR(S) | : Hidenori Yamada | |

It is certified that error appears in the above-identified patent and that said Letters Patent is hereby corrected as shown below:

On the Title Page

Item (72), inventor, city, delete "Toyota" and insert --Toyota-shi Aichi-ken--, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*